Sept. 9, 1969  H. ROESLER ET AL  3,466,443
RADIATION APPARATUS WITH AN ADJUSTABLE EMISSION
OF ULTRAVIOLET RADIATIONS
Filed Jan. 25, 1966  8 Sheets-Sheet 1

INVENTORS
Hans Roesler &
Bernhard Eisermann

BY

ATTORNEY

INVENTORS
Hans Roesler &
Bernhard Eisermann

United States Patent Office 3,466,443
Patented Sept. 9, 1969

3,466,443
RADIATION APPARATUS WITH AN ADJUSTABLE EMISSION OF ULTRAVIOLET RADIATIONS
Hans Roesler, Bruchköbel, near Hanau, and Bernhard R. R. Eisermann, Hanau, Germany, assignors to Quarzlampengesellschaft m.b.H., Hanau am Main, Germany
Filed Jan. 25, 1966, Ser. No. 522,863
Int. Cl. H01j 5/18
U.S. Cl. 250—86          7 Claims

ABSTRACT OF THE DISCLOSURE

Radiation apparatus for emitting radiation of mixed spectral composition including a mixture of UV-A and UV-B radiation, the ratio of UV-B radiation to UV-A radiation being controllable by a manual control which has a first, low sensitivity adjustment range embracing the low ratios of UV-B to UV-A radiation and a second high sensitivity adjustment range embracing the high ratios of UV-B to UV-A radiation. The manual control determines the position of a UV-B blocking, UV-A passing filter by way of a transmission mechanism which automatically alters the transmission ratio (i.e., the ratio of control motion to filter motion) when passing from one adjustment range to the other.

Field of the invention

The present invention is directed to an ultraviolet radiation apparatus embodying improved means for adapting the emitted radiation to the specific skin sensitivity of each individual to be exposed to the radiation.

Ultraviolet radiation devices are commonly employed to effect therapeutic action or tanning (pigmentation) of the skin. An undesirable effect of these applications of such devices is a pronounced reddening of the skin (erythema). The pigmentation produced by these devices is of two types, direct pigmentation and secondary pigmentation.

Direct pigmentation presupposes that pigments are present in the skin which have faded due to lack of ultraviolet exposure. The long wave ultraviolet rays between 400 and 310 μ (millimicrons), which are designated as UV-A rays, are capable of darkening faded pigments.

Secondary pigmentation is the new formation of pigments in the skin after an initial erythema has faded. This initial erythema results from exposure to medium wave ultraviolet rays, whose wave length is shorter than 310 μ and which are designated as UV-B rays. In most people pigment formation is indispensable for tanning, and this is the reason why radiation of the correct spectral composition, including an accurate ratio of UV-B radiation to UV-A radiation suited to the individual user's skin, must be emitted by sunlamps to achieve optimum effectiveness.

Description of the prior art

Normal ultraviolet radiation devices used as sunlamps are not capable of accomplishing this. There are, however, ultraviolet radiation devices known in the art with which an adjustable spectral composition, and more particularly, an adjustable mixture of UV-A-rays and UV-B-rays, can be achieved by means of filters having a displaceable opening, or by means of displaceable filters. Such a radiation apparatus usually comprises a high-pressure mercury-vapor lamp in a reflector and a filter impervious to the UV-B radiation producing the erythema, but substantially pervious to the UV-A-radiation. The filter may be tubular and surround the lamp or it may cover the reflector outlet in the form of strips. For the purpose of varying the ratio of the filtered to the unfiltered radiation, an opening whose size is variable or controllable is provided either in the filter or between the filters (see, for example, German Patent No. 1,114,599, issued Oct. 14, 1965, or German Gebrauchsmuster No. 1,804,014).

In all of the heretofore known filter devices of this type, the manner in which the ratio of the filtered radiation to the unfiltered radiation is adjusted is inadequate to satisfy the above described dermatological requirements. The operation of the adjusting mechanism in these prior art devices is difficult and involves considerable problems, particularly for untrained personnel.

With respect to tubular filters which are divided approximately at the height or level of the reflector apex, it is known to displace either one or both cylinders along the axis of the elongated lamp. A rotary motion is transmitted from an adjusting knob to the filter means by way of a connecting rod. The rotary movement at the adjusting knob produces an approximately uniform setting motion for the filter means.

According to another known construction, the setting or adjusting knob is connected with a threaded spindle. The filter is connected to a threaded nut and may therefore be displaced by rotation of the spindle. This method is employed with both flat filters and tubular filters.

Summary of the invention

All of the known filter adjusting mechanisms involve the disadvantage that the range of control movement corresponding to the UV-B to UV-A ratios needed for tanning a wide range of human skins is very markedly compressed. The existing adjusting or tuning scales are very short and are not characterized by different control sensitivities in a cosmetic and therapeutic range. In none of these cases is an exact and safely reproducible UV-B/UV-A ratio adjustment possible. This, however, is essential for achieving the desired success.

For direct pigmentation, the filter may be entirely closed. In the case of the considerably more frequently occurring task of forming secondary pigments, the necessary ratio of energy of the UV-B radiation producing an erythema to the filtered long-wave UV-A-radiation varies between 1:20 to 1:100. The proportion of short-wave UV-B rays added to the UV-A is always limited in comparison with the latter. An adjustable filter device should be variable between the UV-B to UV-A ratio limits indicated. For therapeutic use, the filter would have to be adapted to be opened up to a limit which corresponds to the emission of radiation of unfiltered devices. An apparatus which is equipped in accordance with both of these criteria is of a universal applicability. All of the known devices concerned with this problem have the disadvantage that the adjustability proceeds linearly or approximately linearly over all the above-mentioned ranges. The transition between the ranges has heretofore not been taken into consideration at all.

It is accordingly an object of the present invention to provide improved ultraviolet radiation, or sunlamp, apparatus by means of which these disadvantages are eliminated. It is a further object of the invention to provide an apparatus which satisfies the above-mentioned criteria in an optimum manner and simultaneously renders possible an exact adjustment which may be reproduced with certainty. Another object of the present invention is concerned with the provision of a radiation apparatus emitting an adjustable ratio of rays of filtered long-wave ultraviolet radiation (UV-A) and unfiltered ultraviolet radiation producing erythema which is characterized in that the adjusting range for the formation of the secondary pigment is spread, i.e., that the control sensitivity over this range is less than the control sensitivity over the balance of the adjustment range of the device.

It will be apparent from the foregoing statements that both the adjustment for direct pigmentation and also the adjustment for the therapeutic application ar non-critical. On the other hand, however, particular emphasis must be placed on the range of the secondary pigmentation, the so-called "cosmetic range." In this range, the UV–B to UV–A radiation ratios must be observed particularly carefully. An ordinary quartz lamp operated with a mercury-vapor discharge emits the long-wave radiation (UV–A) and the radiation producing erythema (UV–B) approximately in a ratio of 1:1. By action filtering action, a variable ratio between 1:20 and 1:100 must be obtained. Referred to a practical example, this means that when a gap of approximately 20 mm. between two mutually axially displaceable filter cylinders is the unfiltered or therapeutic adjustment, a gap of about 4 mm. down to the completely closed condition represents the "cosmetic range." If filter displacement were linearly related to control movement over the entire opening path from 20 mm. to the completely closed condition, this would result, for the cosmetic range which corresponds to a stroke of only 4 mm., in a range of control movement which is much too small for convenient and accurate manipulation. It should, furthermore, be considered that any adjusting mechanism must have play, because of thermal stress, in order to avoid jamming. The effect of this play on accuracy of adjustment is obviously much greater when the range of control movement is small, as in the prior art.

Due to the spreading of the cosmetic range of control movement as proposed by the present invention, the heretofore existing disadvantages are obviated. The present invention makes possible accurate and repeatable filter adjustment over the cosmetic range, and thus makes possible accurate regulation and subsequent resetting to accommodate the individual user's skin. It is thus possible for anyone to quickly and easily test the adjustment appropriate for his skin type and to reproduce this adjustment at any time in accordance with his skin sensitivity. The accuracy of the adjustment is not impaired even by the necessary play.

In carrying out the invention, manual operable control means are coupled to the filter positioning means through two different and successive transmission ratios, a low transmission ratio being provided for the range which is spread, i.e., the low sensitivity range. With the aid of the other, higher transmission ratio the filter gap may be fully opened over a relatively small, high sensitivity adjusting range in order that a therapeutic effect is achieved, if this is desired. According to a further teaching of this invention, a noticeable resistance in the operation of the manually operable control means has to be overcome for the transition from and to the spread, low sensitivity adjusting range. This assures particular degree that the user may easily distinguish between the adjusting ranges.

One embodiment of the inventive concept contemplates the provision of control means such as a pointer lever or finger whose short arm is formed as a cam which is under preliminary spring tension to abut against a second lever connected to the filter positioning. The cam is so contoured that the second lever is deflected slightly over a relatively large deflection range of the control means and considerably over a relatively small deflection range of the control means. In this embodiment, the cam contour changes at the point of transmission from or to the spread adjusting range, thus changing the transmission ratio. The cam follower plate on the second lever is advantageously spring loaded by a tension spring which extends from the second lever to a point on the long arm of the pointer lever in such a manner that the spring will intersect the pivot axis of the pointer lever in the mid-position of the large pivot range. This affords the additional advantage of automatic locking so that the pointer lever will remain locked in each adjusted position.

According to another embodiment of the inventive concept, the control means consists of a pointer lever whose pivot point is positioned at the free end of an intermediate lever, and whose short arm has a protrusion which engages in an elongated slot in a lever which is operatively connected to the filter positioning means. The intermediate lever is spring-loaded against a stationary abutment and equipped, near its fulcrum, with a lateral stop for the long arm of the pointer lever. For the spread, low sensitivity cosmetic adjusting range, pivoting of the pointer arm takes place about its pivot on the intermediate arm, and the control movement to filter movement, or transmission, ratio is low. At the end of the cosmetic range and at the transition to the therapeutic range, the long arm of the pointer lever abuts against the stop on the intermediate lever and, starting from this position, both levers move about the intermediate arm pivot point so that a relatively high transmission ratio is produced.

The inventive concept may also be reduced to practice in an embodiment according to which the control means consists again of a pointer lever which is provided about the pivot point thereof with two arculate members each having a different radius. A lever, which is connected with the filter positioning means, also comprises two arcuate members each of which has a different radius and which are positioned concentrically to the pivot point thereof. Either the arc element of small radius of one lever is brought into operative engagement with the arc element of the large radius of the other lever or the arcuate member of large radius of the one lever in brought into engagement with the arcuate member of small radius of the other lever. The arcuate members are so arranged that the transmission ratios provided by the arcuate members will switch during the transition from the spread range to the therapeutic range. The transmission of the control movement may be obtained either by friction or by means of toothed arcuate member. Reliable engagement may be assured by making the arcuate members with the small radii complete circular arcs.

Brief description of the drawings

Further details, objects and advantages of the present invention will become more readily apparent from the following description when taken in connection with the accompanying drawings, wherein:

FIG. 1 illustrates a radiation apparatus generally designated with reference numeral 10, comprising a reflector 12 and an ultraviolet radiator or emitter 14 as well as two infrared radiators 16. The ultraviolet radiator 14 is enclosed by two filter cylinders 18 and 20. The upper cylinder 18 is connected with a shackle 22 and the lower cylinder 20 is connected with a shackle 24. The two shackles 22 and 24 are hingedly connected to a swing base 26 so that, when the swing base 26 is pivoted about its center, the two cylinders 18 and 20 are axially moved either toward one another or away from each other. In this manner, there is produced between the cylinders 18 and 20 an annular clearance or gap 28 which is variable in size and through which unfiltered radiation may emerge. This type of filter displacement means is well known and therefore need not be explained here in further detail.

Figure 1:
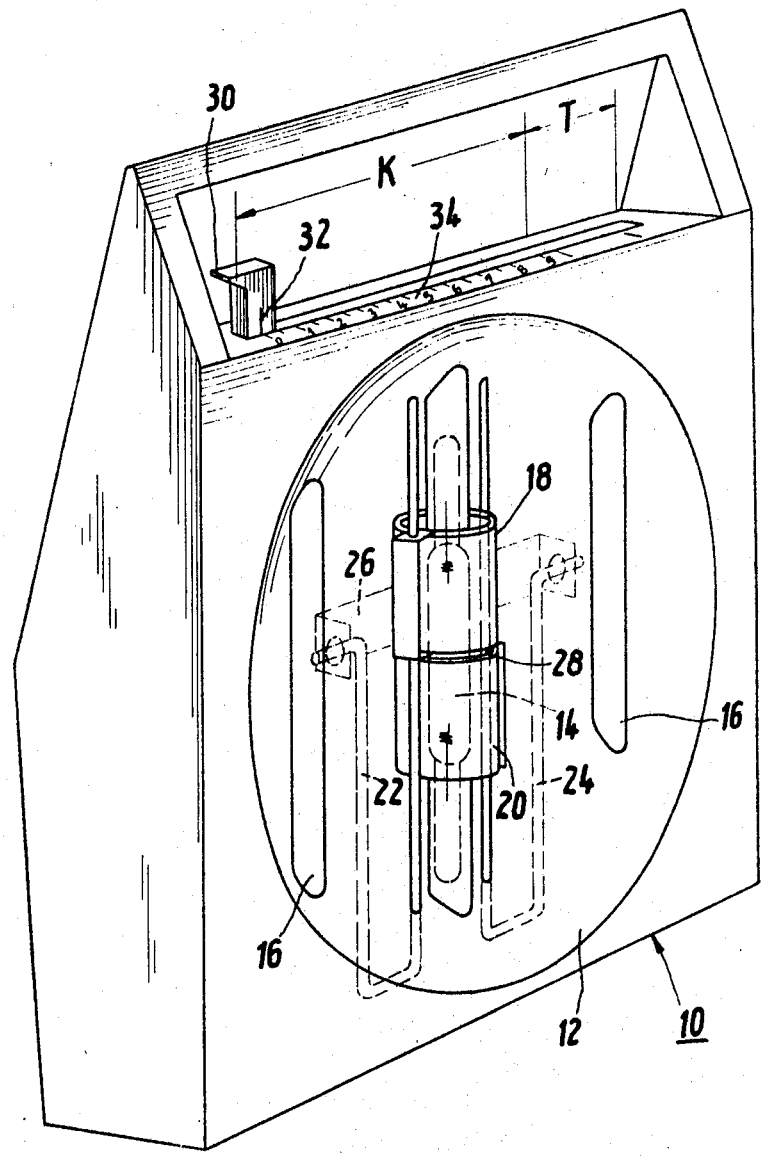
FIG. 1 is a schematic perspective view of a radiation apparatus according to the present invention.

Also shown and discernible in FIG. 1 is a pointer lever or indicating pointer 30 provided with a marking 32 which may be read opposite a scale 34. The range K of the scale 34 indicates the "cosmetic range" and the range T indicates the "therapeutic range." Displacement of the pointer lever 30 over the range K corresponds to a small opening of gap 28, and displacement of the lever 30 over the range T corresponds to a relatively large opening of gap 28. It will be apparent from the following description how the pointer lever 30 is coupled with the swing base 26 for the purpose of achieving this effect.

Description of the preferred embodiment

Figure 2:
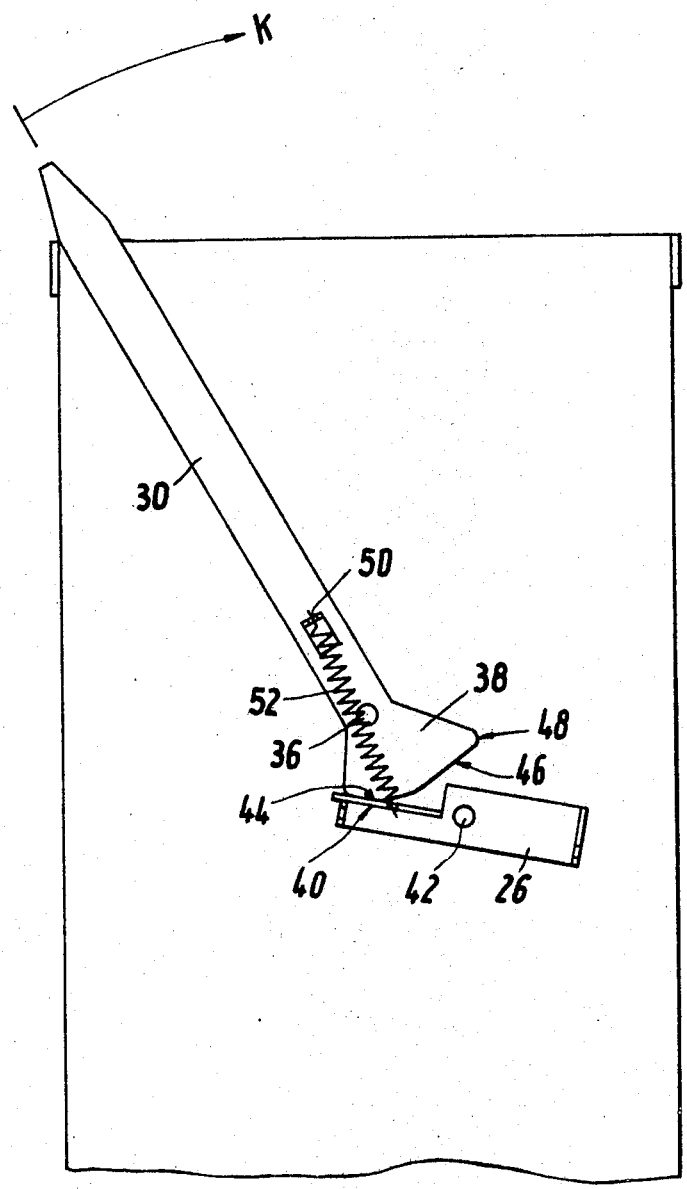
FIG. 2 is a schematic illustration of a first embodiment of the present invention in a position in which the filter is completely closed.
Figure 3:
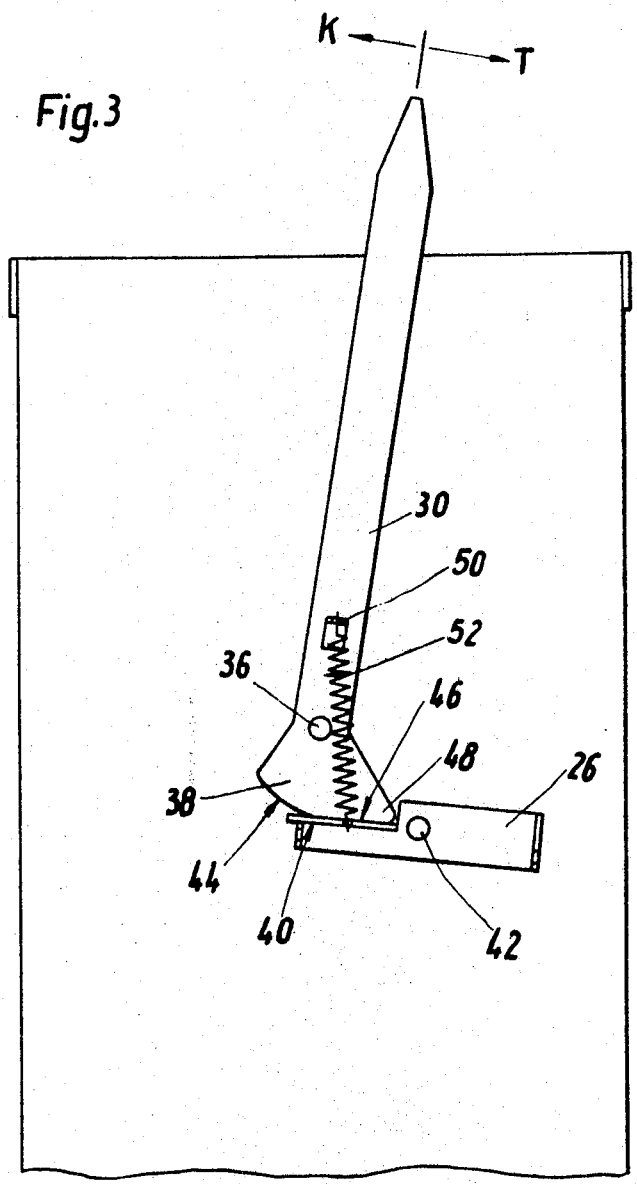
FIG. 3 is a schematic illustration similar to that of FIG. 2 in a position in which the transition from the cosmetic range to the therapeutic range takes place.
Figure 4:
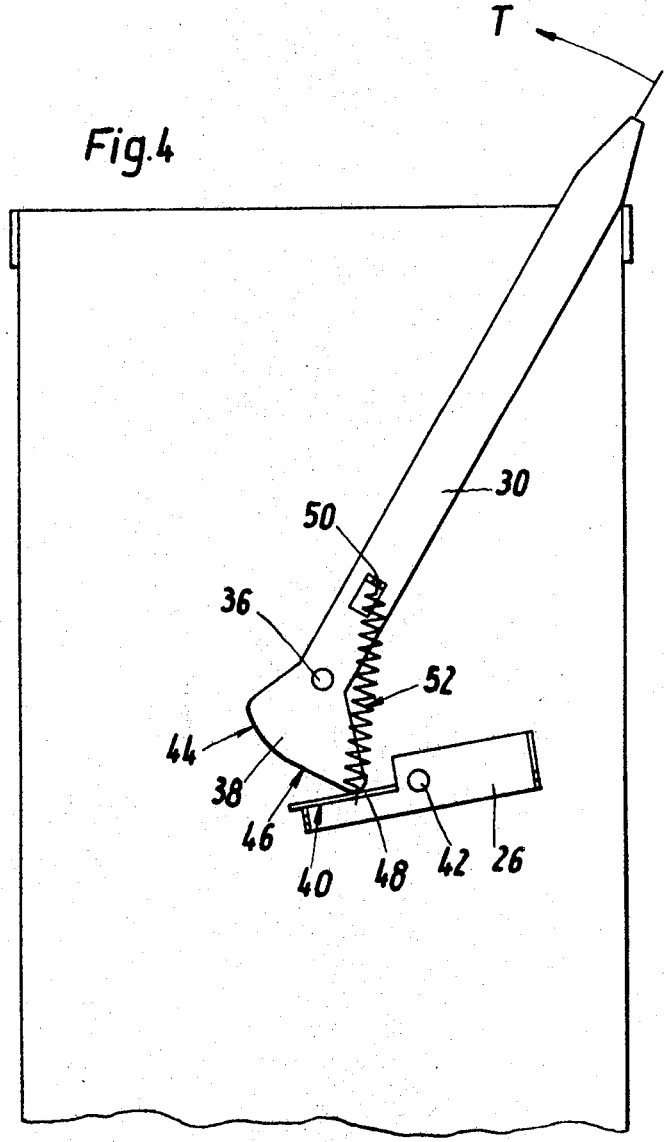
FIG. 4 is an illustration similar to FIG. 2 in a position in which the filter is completely open.

According to the embodiment of FIGURES 2 to 4, the pointer lever 30 is hingedly connected within the joint or fulcrum 36. Below the joint 36, the pointer lever 30 becomes a cam 38. The cam 38 abuts against a surface 40 of the swing base 26 which, in turn, is pivoted about the pivot point 42. Hinged to the two lateral ends of the swing base 26 are the rods 22 and 24, as is apparent from FIG. 1.

For the displacement range K, a cam surface 44 on the cam is operative and cooperates over this range with the surface 40 (FIG. 2). In the position shown in FIG. 3, the transition from the range K to the range T takes place. In this position, a surface 46 of the eccentric 38 rests against the surface 40. When the indicating pointer or pointer lever 30 is moved past this position, a tangible resistance must be overcome which shows that the transition from the K range to the T range takes place at this point. In the position shown in FIG. 4, a cam surface 48 is effective and brings about a relatively great deflection of the swing base 26.

Between the position of the indicating pointer 30 shown in FIG. 2 and the position thereof shown in FIG. 3, the cam surface 44 effects a slight pivoting or swiveling of the swing base 26 about the pivot point 42. This pivoting action results in a relatively small opening of gap, for example, 4 mm. If, thereafter, the cam 48 becomes effective (FIG. 4), there will result a considerable deflection of the swing base 26 about the pivot point 42 which, in the example chosen above, could produce an additional opening of about 16 mm. in gap 28 (FIG. 1).

Between the surface 40 and an ear 50 positioned on the long arm of the indicating pointer 30, a tension spring 52 is arranged under tension. This tension spring effects an automatic locking of the abutment of the eccentric 38 against the surface 40, and a play is simultaneously prevented. The points of suspension of the tension spring 52 are so chosen that the axis of the tension spring 52 intersects the axis of pivot 36 when the indicating pointer 30 is in the mean position of the range K.

Figure 5:
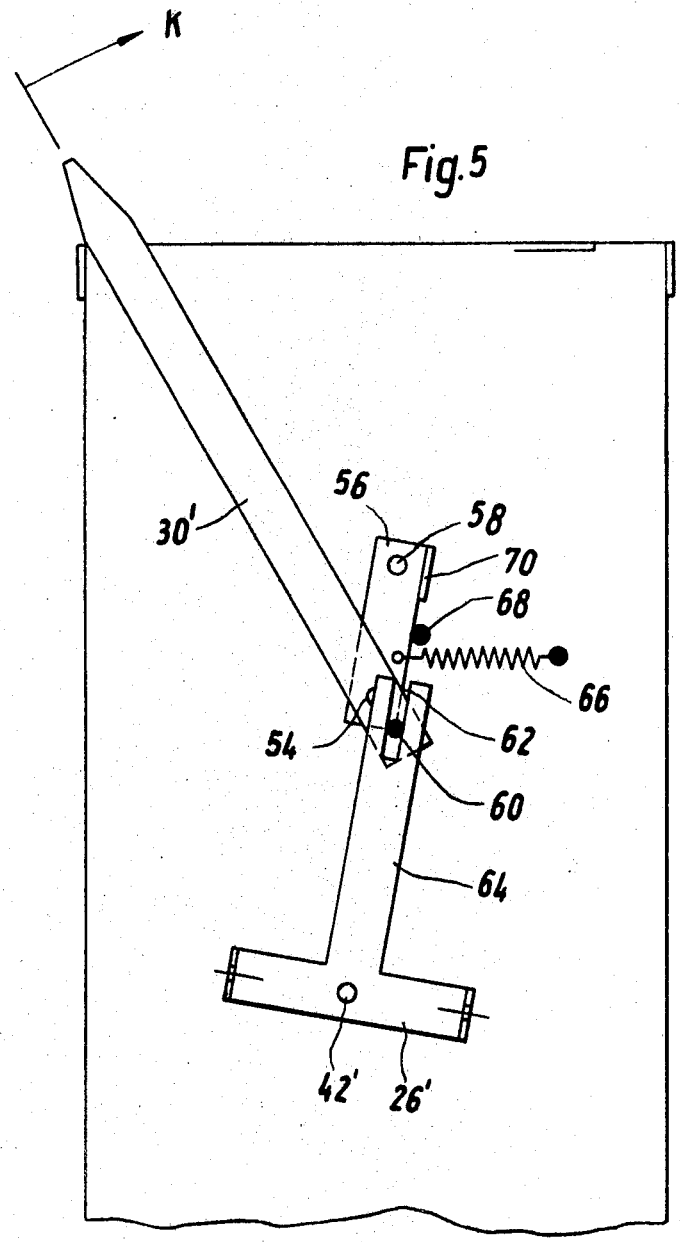
FIG. 5 is a schematic illustration of a modified embodiment according to the present invention in a position which corresponds in the effect thereof to the position shown in FIG. 2.
Figure 6:
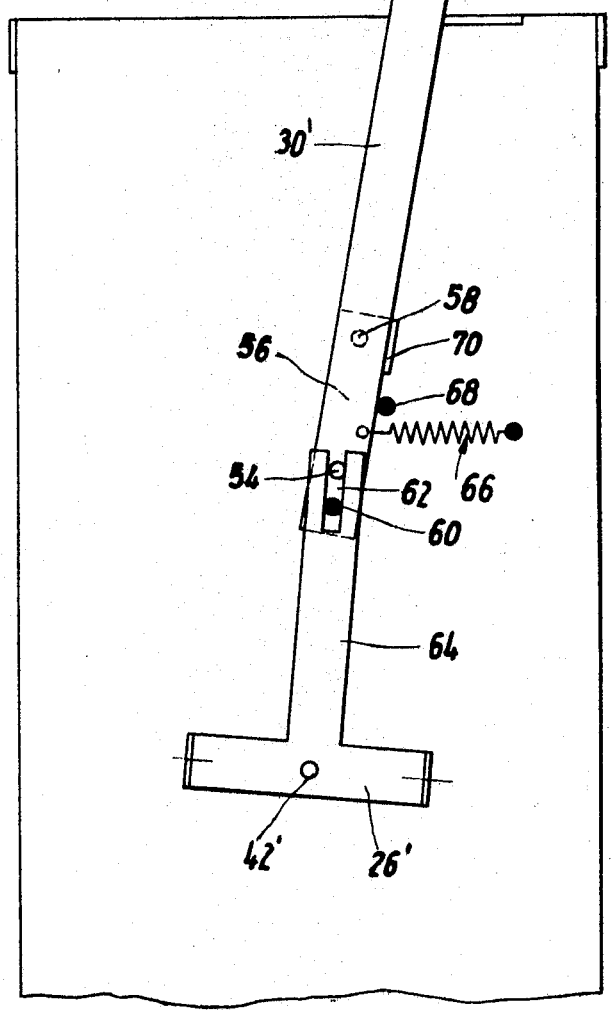
FIG. 6 shows a different position of the embodiment illustrated in FIG. 5.
Figure 7:
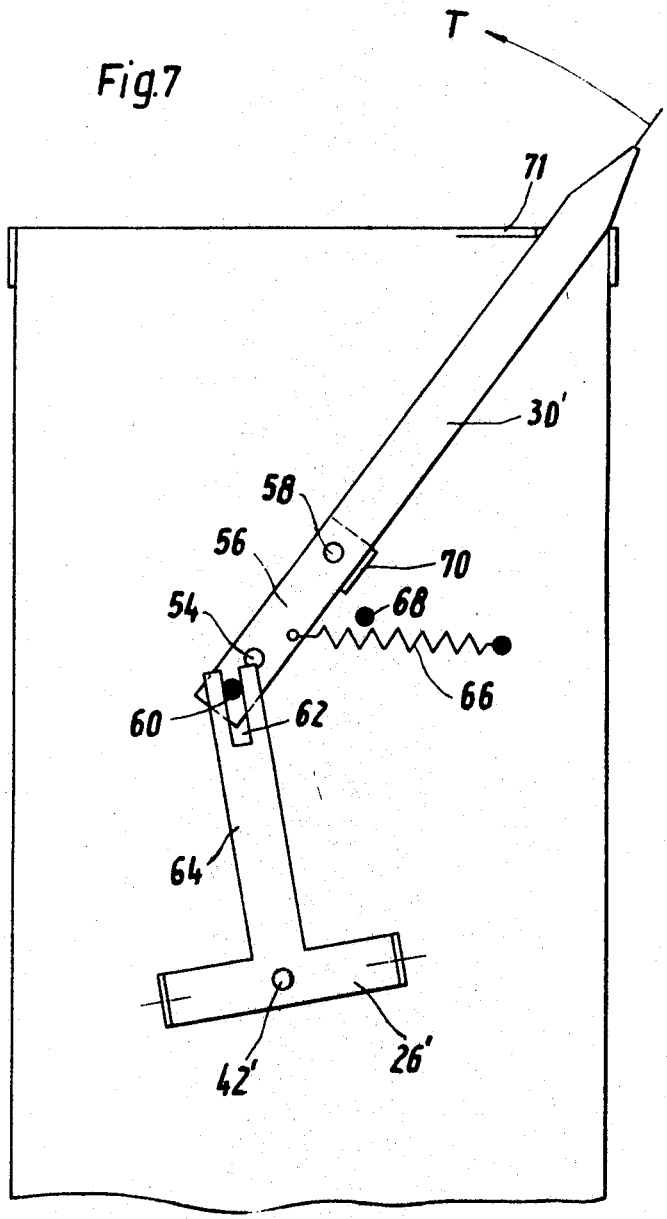
FIG. 7 shows yet another position of the embodiment according to FIG. 5.

FIGURES 5 to 7 illustrate a different embodiment of the present invention. An indicating pointer 30 again serves as a handle which may be pivoted in the manner described hereinbefore over a cosmetic range K and a therapeutic range T. The movement is again transmitted to the filter cylinders 18 and 20 by means of a swing base 26. The pointer position of FIG. 5 corresponds to the above-described FIG. 2, FIG. 6 corresponds in this respect to FIG. 3, and FIG. 7 corresponds in this respect to FIG. 4. In contrast to the previous embodiment, the pivot point 54 for the indicating pointer 30 is positioned on an intermediate lever 56 which, in turn, may be pivoted about a pivot point 58. Rigidly secured to the small arm of the indicating pointer 30 beyond the joint 54 is a pin 60 which is adapted to glide within a slot 62. The slot 62 is positioned on an arm 64 which is rigidly connected to the swing base 26.

The intermediate lever 56 is pulled by a tension spring 66 against a stationary stop 68. Furthermore, the intermediate lever 56 is provided with a lateral stop 70 which is disposed in proximity to the joint 58. When the indicating pointer 30 is pivoted toward the right from the position shown in FIG. 5, the intermediate lever 56 remains in its position of rest and the swing base 26 is swung by the arm 64 in a transmission ratio which corresponds to the ratio of the distance of the pin 60 from the joint 54, to the distance of the pin 60 from the joint 42. At the end of the cosmetic range and in the position shown in FIG. 6, the indicating pointer 30 abuts against the lateral stop 70 and, during the further pivoting of the indicating pointer 30 over and beyond the position shown in FIG. 6 toward the right into the position shown in FIG. 7, the intermediate lever 56 is taken along by the indicating pointer 30. At that time, the indicating pointer 30 pivots together with the intermediate lever 56 about the common pivot point 58, and the intermediate lever 56 lifts off the stop 68 against the action of the spring 66. The swing base 26 is thereby pivoted in a transmission ratio which corresponds to the ratio between the distance of pin 60 from hinge 42 to the distance of pin 60 from joint 58. In the end position which is apparent from FIG. 7, the indicating pointer 30 may be caught or engaged behind a projection 71 so that it is locked in this position.

Figure 8:
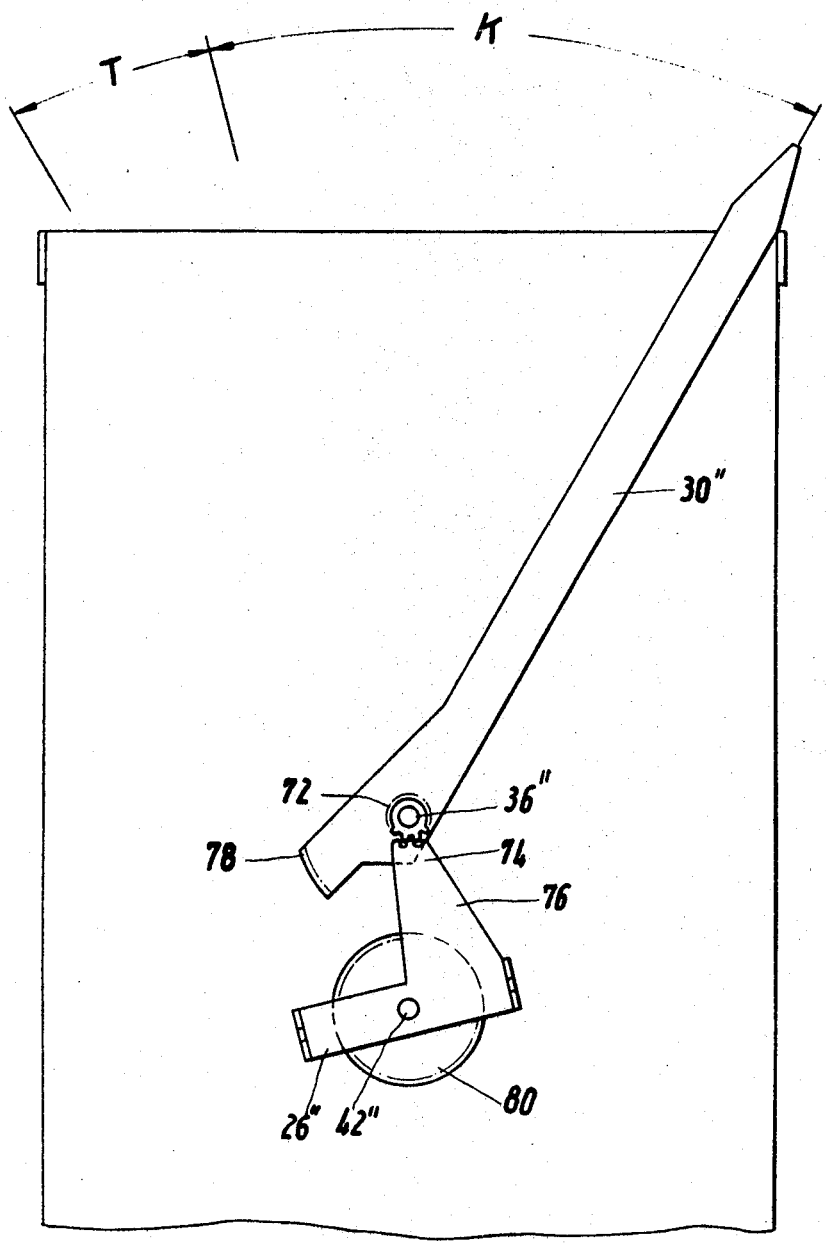
FIG. 8 is a schematic illustration of a further modified embodiment of the present invention.

The further embodiment shown in FIG. 8 corresponds to the embodiments described hereinabove in that swing base 26 is pivotable about pivot point 42. An indicating pointer 30 again serves as a handle and the position of the indicating pointer 30 shown in FIG. 8 corresponds in its operation to the position of the indicating pointer 30 as shown in FIGURES 2 and 5 respectively. This means that the control adjustment ranges K and T are disposed, in the representation of FIG. 8, in a mirror-image-like manner as compared to the illustrations described hereinabove. A circular element 72, which is rigidly connected to the indicating pointer 30, is effective for the cosmetic displacement range and is arranged concentrically with joint 36. In operative engagement with this element is a circular sector 74 which is arranged at the outer periphery of a lever 76 rigidly connected to the swing base 26. The center of curvature of circular sector 74 coincides with the pivot point 42. The operative engagement between the element 72 and the circular sector 74 may be accomplished by means of gear teeth (not shown). When, at the end of the adjustment range K and at the transition to the adjustment range T, the circular sector 74 becomes disengaged from the element 72, a circular sector 78, which is rigidly connected to the indicating pointer 30 and centered at the joint 36, becomes effective. This circular sector 78 comes into engagement with a circular element 80, which is rigidly secured to the swing base 26 and is positioned concentrically to the pivot point 42. The circular sector 78 and the element 80 may comprise teeth (not shown) which mesh with one another.

The different transmission ratios for the adjustment range K, on the one hand, and for the adjustment range T, on the other hand, are determined respectively by the ratio of the radius of the element 72 to the radius of the circular sector 74 and by the ratio of the radius of the circular sector 78 to the radius of element 80.

While preferred embodiments have been shown and described, it will be apparent to those skilled in the art that changes can be made without departing from the principles and spirit of the invention, the scope of which is defined in the appended claims. Accordingly, the foregoing embodiments are to be considered illustrative rather than restrictive of the invention, and those modifications which come within the meaning and range of equivalency of the claims are to be included therein.

The invention claimed is:
1. Radiation apparatus, comprising:
 (a) source means emitting both UV–A radiation and UV–B radiation;
 (b) filter means adapted to pass UV–A radiation and block UV–B radiation;

(c) positioning means for maintaining said filter means in selected positions with respect to said source, said filter means intercepting a different amount of the radiation emitted by said source in each of said selected positions;

(d) manually operable control means for controlling said positioning means, said control means being movable over a first range of adjustment or over a second range of adjustment which is of lesser extent than said first range of adjustment;

(e) and coupling means for coupling said control means and said positioning means, said coupling means operating in a first mode of operation when said control means is in said first range of adjustment, and in a second mode of operation when said control means is in said second range of adjustment, said first mode of operation being non-linear in that equal increments of movement of said control means in different parts of said first range of adjustment produce unequal increments of movement of said filter means.

2. Radiation apparatus as claimed in claim 1 in which said coupling means includes means for producing a noticeable resistance to the moving of said control means when said control means is moved from one of said ranges of adjustment to the other.

3. Radiation apparatus according to claim 2 in which said coupling means comprises second lever means and cam means, said cam means being rotated about a pivot by said first lever means and said second lever means being spring biased into contact with said cam means, said second lever means being connected to said positioning means, and said control means being located remote from said pivot, said second lever being turned through a small angle when said control means is moved through said first range and being turned through a greater angle when said control means is moved through said second range.

4. Radiation apparatus as claimed in claim 3 in which the means biasing said second lever means into contact with said cam means is a tension spring extending from a point on said second lever means to a point on said first lever means, said points being so located that when said control means is disposed centrally of said first range of adjustment said tension spring intersects the pivot axis of said first lever means, said cam means being contoured to deflect said second lever means to a maximum extent when said control means is located at the end of said second range of adjustment remote from said first range of adjustment.

5. Radiation appartus as claimed in claim 2 in which said coupling means comprises a first lever carrying said control means, a second lever connected to said positioning means, and an intermediate lever, said intermediate lever being pivoted to said apparatus at a first end and having a second end free to rotate about said first end, said first lever being pivoted by pivot means to said intermediate member at said second end thereof and extending beyond said pivot means, the portion of said first lever extending beyond said pivot means including a protrusion, said control means being mounted on said first lever at a location remote from said protrusion, and elongated slot in said second lever engaging said protrusion, and said intermediate lever being spring loaded to engage a stop affixed to the body of said apparatus, and being provided with a projection adapted to engage said first lever when said control means is in said second range of adjustment, whereby said first lever pivots about said first end of said intermediate lever when said control means is in said second range of adjustment.

6. Radiation apparatus as claimed in claim 2 in which said coupling means comprises first lever means pivoted by pivot means to the body of said apparatus adjacent one end, carrying said control means adjacent its other end, and including first and second arcuate members of different radii coaxial with said pivot means, and second lever means connected to said positioning means, pivoted about pivot means affixed to the body of said apparatus, and including first and second arcuate members of different radii coaxial with said pivot means, the location of said pivot means and the radii and extent of said arcuate members being such that the smaller radius arcuate member of said first lever means engages the larger radius arcuate member of said second lever means when said control means is in said first range of adjustment, and the larger radius arcuate member of said first lever means engages the smaller radius arcuate member of said second lever means when said control means is in said second range of adjustment.

7. Radiation apparatus as claimed in claim 6 in which said smaller radius arcuate members are closed to complete circular arcs.

References Cited
UNITED STATES PATENTS 2,569,793 10/1951 Anderson _____ 250—86
2,964,998 12/1960 Middlestadt _____ 350—271
3,333,098 7/1967 Ozasa et al.

RALPH G. NILSON, Primary Examiner

S. C. SHEAR, Assistant Examiner